United States Patent [19]

Raj et al.

[11] Patent Number: 4,830,384
[45] Date of Patent: May 16, 1989

[54] COMPACT LONG-LIFE MAGNETIC FLUID SEAL

[75] Inventors: Kuldip Raj, Merrimack; Ronald Moskowitz, Hollis, both of N.H.

[73] Assignee: Ferrofluidics Corporation, Nashua, N.H.

[21] Appl. No.: 68,012

[22] Filed: Jun. 29, 1987

[51] Int. Cl.[4] .............................. F16J 15/40
[52] U.S. Cl. ............................ 277/80; 277/135
[58] Field of Search ............. 277/80, 135; 384/133

[56] References Cited

U.S. PATENT DOCUMENTS

| | | |
|---|---|---|
| 3,746,407 | 7/1973 | Stiles et al. |
| 4,357,021 | 11/1982 | Raj et al. |
| 4,357,022 | 11/1982 | Raj . |
| 4,407,508 | 10/1983 | Raj et al. |
| 4,523,741 | 6/1985 | Chandler ............... 277/80 X |
| 4,526,379 | 7/1985 | Raj ........................... 277/80 |
| 4,526,484 | 7/1985 | Stahl et al. ............. 277/80 X |
| 4,628,384 | 12/1986 | Raj et al. |
| 4,630,943 | 12/1986 | Stahl et al. ............. 277/80 X |

FOREIGN PATENT DOCUMENTS

| | | | |
|---|---|---|---|
| 231271 | 12/1984 | Japan ............. | 277/80 |
| 125467 | 7/1985 | Japan ............. | 277/80 |
| 31776 | 2/1987 | Japan ............. | 277/80 |
| 653470 | 3/1979 | U.S.S.R. .......... | 277/80 |

OTHER PUBLICATIONS

Page from NSK Catalog (Japanese), Date Unknown.

*Primary Examiner*—Allan N. Shoap
*Attorney, Agent, or Firm*—Wolf, Greenfield & Sacks

[57] ABSTRACT

A compact long-life magnetic fluid seal for sealing between a housing and a magnetically permeable rotating shaft includes an annular magnet having a closely-spaced, noncontacting relationship with the shaft to define a first gap and an annular pole piece axially abutting the magnet and having a closely-spaced, noncontacting relationship with the shaft to define a second gap. The first gap has a slightly larger radial dimension than the second gap, and the first and second gaps together define an elongated annular space for retention of a magnetic fluid. The outer edges of the pole piece and magnet inner surfaces can be rounded to limit splashing of the magnetic fliud. In another embodiment, a magnetic fluid seal includes first and second pole pieces axially abutting opposite ends of an annular magnet. The magnet has a slightly larger inside diameter than either of the pole pieces. The pole pieces and the magnet together define an elongated annular gap for retention of magnetic fluid. The seal structure permits introduction of a relatively large volume of magnetic fluid, thereby extending the seal life, while maintaining a short axial dimension.

5 Claims, 5 Drawing Sheets

COMPACT LONG-LIFE MAGNETIC FLUID SEAL

FIELD OF THE INVENTION

This invention relates to a long-life magnetic fluid seal and, more particularly, to a compact magnetic fluid seal with a short axial length and with a construction which provides long life in comparison with prior art magnetic fluid seals. The magnetic fluid seal of the present invention is particularly useful in a computer magnetic disk drive, but is not limited to such use.

BACKGROUND OF THE INVENTION

In modern disk drive assemblies, mechanical clearance between the surface of the magnetic disk which stores data and the read/write head which transfers data to and from the disk is extremely small, i.e., about 10 microinches. Any particulate contamination on the disk surface or in the region of the read/write head is likely to cause a malfunction of the assembly. Consequently, the computer disk and the head must be enclosed and must be protected against contamination from the outside environment. The motor which drives the disk shaft and the bearings which support the disk shaft are sources of contamination due to their mechanically movable parts. However, it is generally inconvenient to enclose the motor, and contamination can arise from other sources and be carried into the disk drive region. Thus, a magnetic fluid exclusion seal is typically employed on the drive shaft to prevent contaminants from the motor and the bearings and from the external environment from reaching the interior of the disk assembly along the drive shaft.

The trend toward miniaturization of disk drives has required thinner and thinner drives, thereby severely limiting the axial space available for magnetic fluid seals and bearings and requiring designs with a very small axial length, or thickness. Magnetic fluid seals for use in small disk assemblies such as 5¼ inch and 3½ inch spindles are typically required to have an axial thickness on the order of 1 millimeter.

Magnetic fluid, or ferrofluid, seals are generally known in the prior art. One prior art seal which is suitable for applications requiring a short axial length is a single pole piece ferrofluid seal disclose in U.S. Pat. No. 4,407,508, issued Oct. 4, 1983 to Raj et al. An annular pole piece surrounds the shaft to be sealed, and an annular permanent magnet of larger inside diameter than the pole piece is secured to one surface of the pole piece. The magnetic circuit extends through the magnet, the pole piece, a magnetic fluid in the gap between the pole piece and the shaft, through the shaft and is completed through the air gap between the shaft and the magnet. While such magnetic fluid sells provide satisfactory performance and a short axial length, the quantity of ferrofluid which is retained in the gap between the pole piece and the shaft is relatively small. As a result, the operational life of the seal is limited. Any attempt to increase the fluid quantity in the seal results in a ferrofluid splash from the seal region during operation.

Magnetic fluid seals including an annular magnet and two pole pieces, one on each end of the magnet, are known in the prior art. Two-pole seals having configurations with extended seal life are disclosed in U.S. Pat. Nos. 4,357,021, issued Nov. 2, 1982 to Raj et al and 4,357,022 issued Nov. 2, 1982 to Raj. These patents disclose seals utilizing pole pieces of unequal width to extend seal life. Although the two-pole piece configurations exhibit an improved seal life, the life may still be inadequate for certain applications such as disk drives operating at high ambient temperatures since the quantity of ferrofluid retained in the gaps between the pole pieces and the shaft is relatively small.

It is a general object of the present invention to provide improved magnetic fluid seals.

It is another object of the present invention to provide a compact magnetic fluid seal having long life.

It is a further object of the present invention to provide a compact magnetic fluid seal having a magnetic flux distribution which limits magnetic fluid splashing.

It is still another object of the present invention to provide a compact magnetic fluid seal which retains a relatively large volume of magnetic fluid.

It is still another object of the present invention to increase the life of a compact magnetic fluid seal without substantially reducing the pressure capacity or increasing the cost thereof.

SUMMARY OF THE INVENTION

According to the present invention, these and other objects and advantages are achieved in a compact long-life magnetic fluid seal for sealing between a housing and a magnetically permeable rotating shaft. The magnetic fluid seal comprises a magnetic assembly coupled to the housing and including an annular magnet producing a magnetic field and having a closely-spaced, noncontacting relationship with the shaft to define a first gap and an annular pole piece with a first end surface axially abutting a first end surface of the magnet and having a closely-spaced, noncontacting relationship with the shaft to define a second gap. The first gap has a slightly larger radial dimension than the second gap, and the first and second gaps together define an elongated annular space between the magnetic assembly and the shaft. The magnetic fluid seal further comprises a magnetic fluid retained in the elongated annular space by the magnetic field, the magnetic fluid permitting relative movement of and sealing the shaft and the housing. The elongated annular space retains a relatively large volume of magnetic fluid, thereby extending the life of the seal.

The seal preferably includes means for substantially confining the magnetic flux to the annular space. The pole piece and the magnet each include an inner surface which defines the outer periphery of the respective gap, and the confining means preferably comprises at least one of the inner surfaces having a generally rounded outer edge to limit outward bulging of the magnetic field. By limiting outward bulging of the magnetic field, bulging and associated splashing of the magnetic fluid are reduced and the life of the seal is extended.

Preferably, the first end surface of the magnet and the first end surface of the pole piece are sealed to prevent leakage of the magnetic fluid therebetween. The inner surface of the magnet, which defines the outer periphery of the first gap, can be provided with an annular groove to retain additional magnetic fluid.

According to another aspect of the invention, a magnetic fluid seal can include a first annular pole piece and a second annular pole piece having end surfaces axially abutting opposite end surfaces of an annular magnet. The pole pieces and the magnet are attached to a housing in a coaxial relationship with a magnetically permeable shaft. The first pole piece, the second pole piece and the magnet each have a closely-spaced, noncontacting relationship with the shaft to define an elongated annular gap for retention of magnetic fluid. The magnet has a slightly larger inside diameter than either of the pole pieces. The two-pole configuration preferably includes flux distribution means for producing differing flux densities in the two pole piece gaps. The flux distribution means can comprise the pole piece gaps having different radial dimensions. The flux distribution means can also comprise the first and second pole pieces having different axial dimensions or a combination of different radial dimensions and different axial dimensions.

BRIEF DESCRIPTION OF THE DRAWINGS

For a better understanding of the present invention together with other and further objects, advantages and capabilities thereof, reference is made to the accompanying drawings which are incorporated herein by reference and in which.

DESCRIPTION OF THE PRIOR ART

Figure 1:
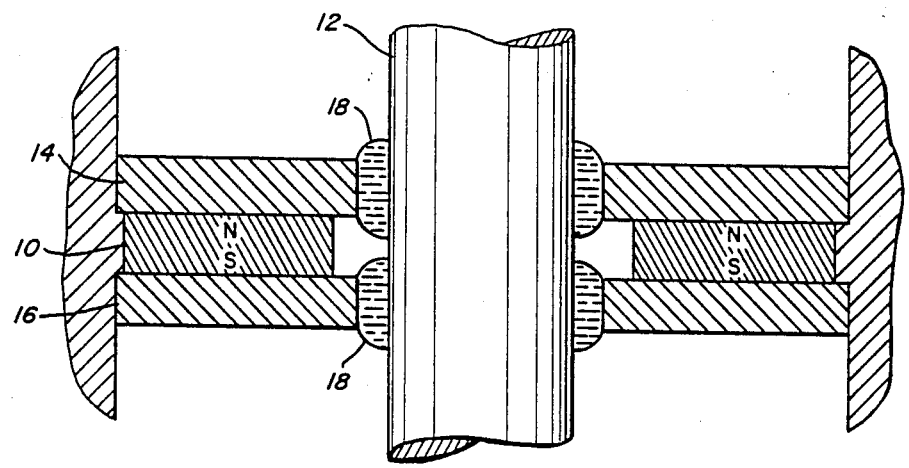
FIG. 1 illustrates a two-pole magnetic fluid seal in accordance with the prior art.

At two-pole magnetic fluid seal in accordance with the prior art is shown in FIG. 1. An annular, permanent magnet 10 is axially aligned with a magnetically permeable shaft 12. Annular pole pieces 14 and 16 are attache to opposite ends of magnet 10 and define annular gaps between their inner surfaces and the shaft 12. A magnetic fluid 18 fills the gaps between the pole pieces and the shaft 12 to form an exclusion seal therebetween.

Figure 2:
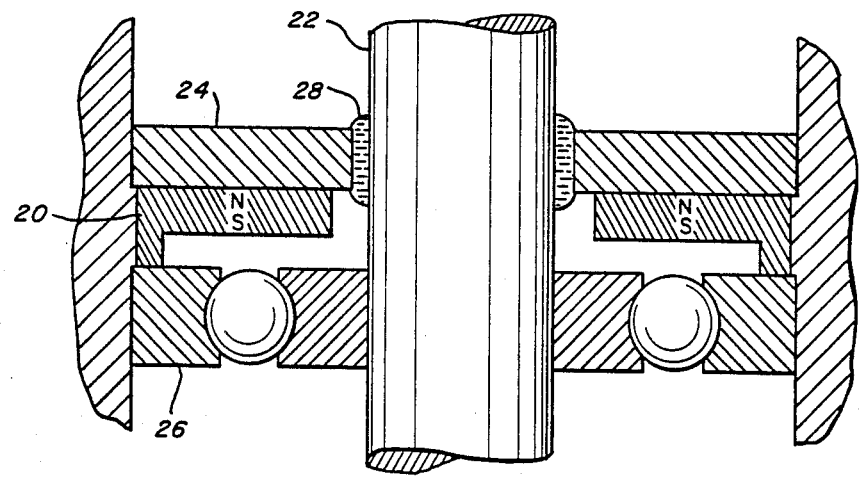
FIG. 2 illustrates a single pole magnetic fluid seal in accordance with the prior art utilized with a ball bearing assembly.

A single pole magnetic fluid seal in accordance with the prior art is shown in FIG. 2. An annular, permanent magnet 20 is axially positioned with respect to a magnetically permeable shaft 22. A single pole piece 24 is attached to one end of the magnet 20 and defines an annular gap between an inner surface of pole piece 24 and the shaft 22. The other end of the magnet 20 is attached to the outer race of a ball bearing 26, which has an inner race attached to the shaft 22. A magnetic fluid 28 fills the gap between the pole piece 24 and the shaft 22 and provides an exclusion seal. The magnetic circuit is completed through the ball bearing 26 and the shaft 22. In another prior art seal, the magnet is separated from the magnetically permeable ball bearing 26 by a small nonmagnetic spacer, thus partially completing the magnetic circuit. In yet another prior art single pole magnetic fluid seal, the ball bearing 26 is not present and the magnetic circuit is completed through an air gap between the magnet 20 and the shaft 22.

In both of the prior art cases described above, the life of the seal is limited by the quantity of magnetic fluid, or ferrofluid, which can be retained in the seal area. Over the life of the seal, the ferrofluid 18 or 28 gradually evaporates until it reaches the point where there is insufficient ferrofluid to create a seal between the pole piece and the shaft. When magnetic fluid is added to the annular gap of prior art seals beyond the quantity normally retained therein, the fluid bulges out at the edges. As shown in FIGS. 1 and 2, the bulging portions of the magnetic fluid tend to splash or spatter during rotation of the shaft, thereby reducing the quantity of magnetic fluid in the seal and reducing the seal life by a corresponding amount.

DETAILED DESCRIPTION OF THE INVENTION

Figure 3:
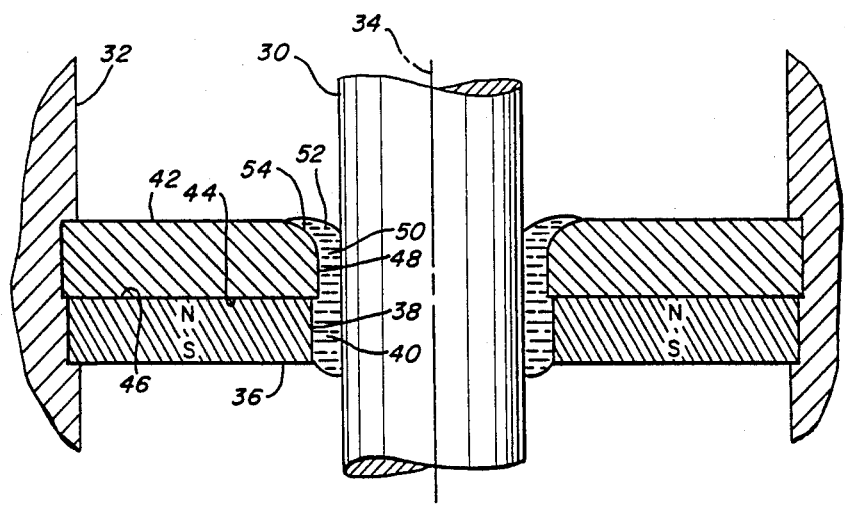
FIG. 3 illustrates a single pole magnetic fluid seal in accordance with the present invention.

A single pole magnetic fluid seal in accordance with the present invention is shown in FIG. 3. A magnetically permeable shaft 30 rotates relative to a housing 32. The shaft 30 is typically supported by bearing assemblies (not shown) of conventional design. The shaft 30 may rotate relative to the housing 32, or the shaft 30 may be fixed and the housing 32 may rotate. A preferred application of the magnetic fluid seal of the present invention is in a computer disk drive which requires an extremely short axial length, on the order of 1 millimeter. One-half of a cross-section of a magnetic fluid seal in accordance with the present invention is illustrated in FIG. 3. It will be understood that the seal is axially symmetric about an axis 34. An annular, permanent magnet 36 is rigidly coupled to the housing 32 and is axially aligned with the shaft 30. An inner surface 38 of the magnet 36 is in closely-spaced, noncontacting relationship with the shaft 30 so as to define an annular gap 40 between the shaft 30 and inner surface 38. An annular pole piece 42 of magnetically permeable material has a first end surface 44 axially abutting add sealed to a first end surface 46 of permanent magnetic 36. The pole piece 42 includes an inner surface 48 in closely-spaced, noncontacting relationship with the shaft 30 so as to define an annular gap 50 between the pole piece 42 and the shaft 30.

The annular gaps 40, 50 together define an elongated annular space for retention of a magnetic fluid 52. The magnet 36 is axially polarized and produces magnetic flux in the pole piece 42 and in the annular gaps 50, 40. The magnetic circuit is completed through the magnetically permeable shaft 30. The magnetic flux produced by magnet 36 retains magnetic fluid 52 in the annular gaps 40, 50 to produce a reliable long-life magnetic fluid seal.

The magnetic fluid 52 is drawn into both of the annular gaps 40, 50. The magnet 36 and the pole piece 42 are dimensioned so that annular gap 40 is slightly larger in radial dimension than the pole piece gap 50 by a few thousandths of an inch. The slightly larger inside diameter of magnet 36 permits it to be machined separately from the pole piece 42 without danger of interference with shaft 30. The seal structure of FIG. 3 ensures sufficient magnetic field in the two gaps to retain ferrofluid, and further permits addition of a larger quantity of fluid to the seal.

Figure 5:
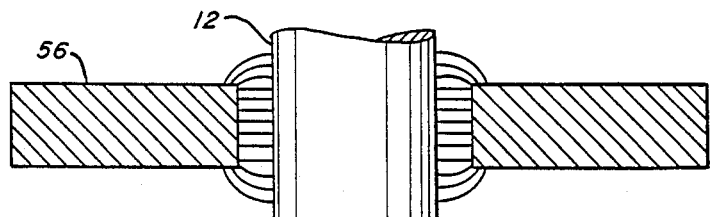
FIG. 5 illustrates the magnetic flux distribution in a prior art magnetic fluid seal.
Figure 6:
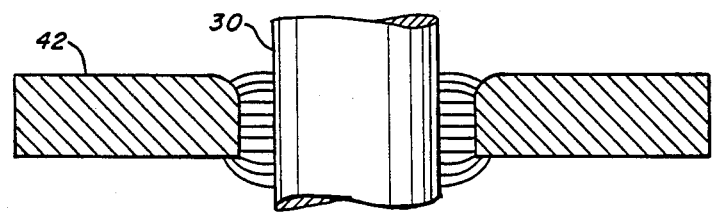
FIG. 6 illustrates the magnetic flux distribution in a single pole seal in accordance with the present invention.

The inner surface 48 of pole piece 42 is rounded off at its outer edge 54, the edge opposite magnet 36 to reduce fringing or bulging of magnetic fields outside the gap 50. As a result, the magnetic fluid 52 is substantially confined to the region of the annular gap 50, and splashing and spattering of magnetic fluid are greatly reduced. As used herein, "rounded" denotes a curved or beveled shape which avoids sharp corners. The shape is not necessarily part of a circle. The flux distribution for a rectangular cross-section pole piece 556 in accordance with the prior art, as shown in FIG. 5, bulges outwardly on either side of the gap between the pole piece and the shaft. With the rounded pole piece 42 edge, as shown in FIG. 6, the flux distribution is substantially confined to the gap region and bulging, or fringing, is limited.

The abutting surfaces 44, 46 of pole piece 42 and magnet 36 are preferably sealed together to prevent magnetic fluid 52 from leaking between these elements and reducing the life of the seal by drawing off a portion of the magnetic fluid.

Figure 4:
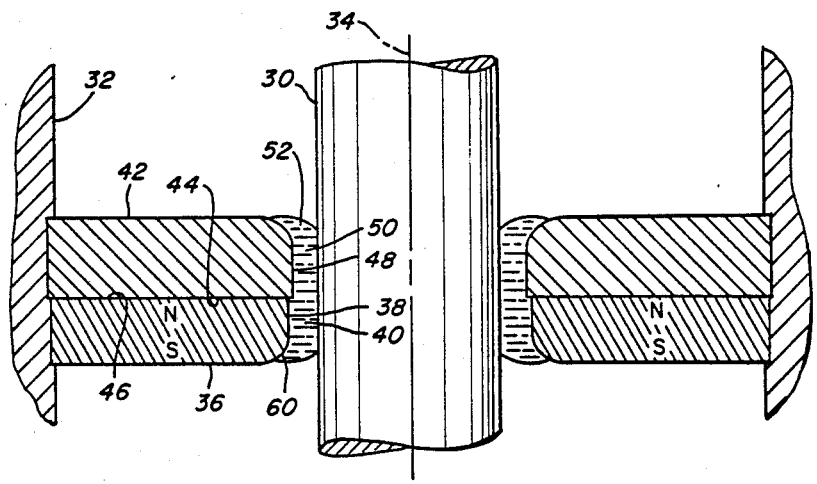
FIG. 4 illustrates another embodiment of a single pole magnetic fluid seal in accordance with the present invention.

Another embodiment of a single pole magnetic fluid seal in accordance with the present invention is shown in FIG. 4. This embodiment is similar to the embodiment of FIG. 3 except that the inner surface 38 of magnet 36 has a rounded outer edge 60, the edge opposite pole piece 42, in order to shape the magnetic flux distribution and prevent fringing magnetic fields which produce a bulge in the magnetic fluid 52. The remaining elements of the magnetic fluid seal shown in FIG. 4 are the same as shown in FIG. 3 and described hereinabove.

The magnetic fluid seal shown in FIGS. 3 and 4 permits a relatively long annular column of magnetic fluid 52 to be retained in the annular space between the pole piece 42 and the magnet 36, on the one hand, and the shaft 30, on the other. By shaping of the magnetic flux distribution and providing a magnet substantially flush with the pole piece, the magnetic fluid is retained relatively uniformly in the elongated annular space, and the tendency for splashing and spattering is substantially reduced. As a result, the life of the seal is substantially increased in comparison with prior art magnetic fluid seals of the same axial length. The field distribution for the prior art seal is shown in FIG. 5. The fringing field causes a bulge in the ferrofluid. The field distribution of the present sell is shown in FIG. 6 and causes only a small bulge when higher magnetic fluid quantities are retained.

A test was made to compare the pressure capacities of a two-pole seal in accordance with the prior art and a single pole piece seal in accordance with the present invention. The two-pole piece seal was constructed generally as shown in FIG. 1, while the single pole piece seal in accordance with the present invention was constructed generally in accordance with FIG. 4. The two-pole piece seal utilized a magnet having an axial dimension of 1.5 millimeters and two pole pieces, each having an axial dimension of 1 millimeter the single pole piece seal utilized a magnet having an axial dimension of 2.5 millimeters and a pole piece having an axial dimension of 1 millimeter. As a result, both seals had the same total axial dimension. The radial dimension of the gap was 0.2 millimeters in each case and the shaft diameter was 7 millimeters. In each case, the magnetic material was a rigid ferrite producing $1.6 \times 10^6$ G-oe and the magnetic fluid was type CFF100, 250 gauss, 140 cp.

Figure 7:
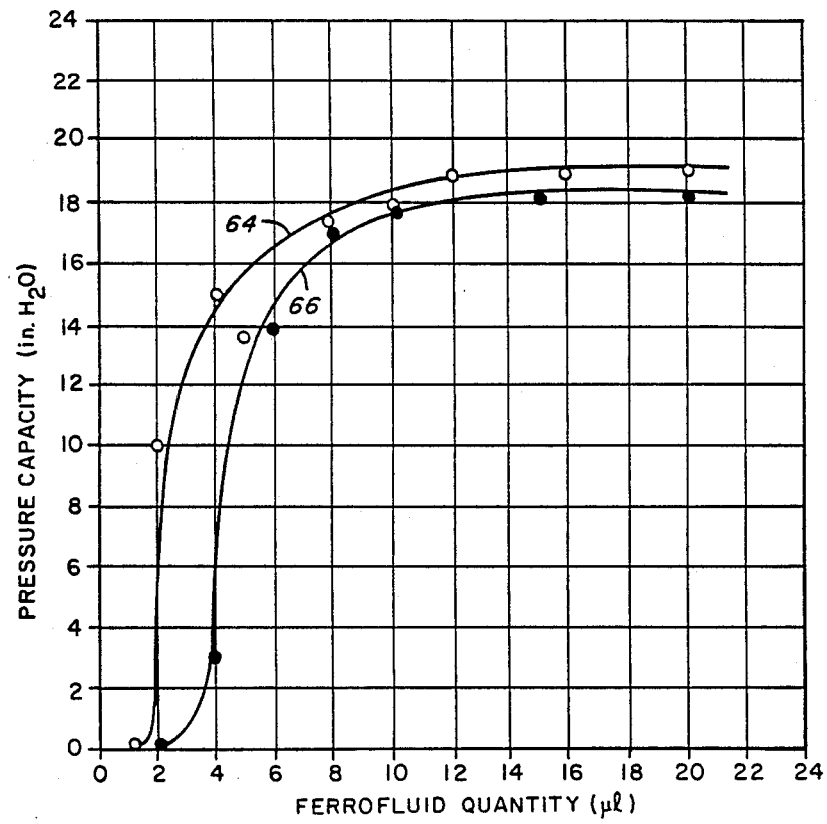
FIG. 7 is a graphic representation of pressure capacity as a function of magnetic fluid quantity for a two-pole magnetic fluid seal in accordance with the prior art and for a single pole magnetic fluid seal in accordance with the present invention.

The measured pressure capacity in inches of water is plotted as a function of ferrofluid quantity in microliters in FIG. 7. Curve 64 illustrates the performance of the prior art two pole piece seal, and curve 66 illustrates the performance of the single pole piece seal in accordance with the present invention. It can be seen that the two seals have approximately the same pressure capacity. However, the two-pole piece seal in accordance with the prior art can safely accommodate only 10 microliters of magnetic fluid whereas the single pole piece seal can accommodate up to 30 microliters. Because of the additional magnetic fluid capacity, the single pole piece seal in accordance with the present invention is expected to have a life 3 to 4 times longer than the two-pole piece seal of the prior art.

Figure 8:
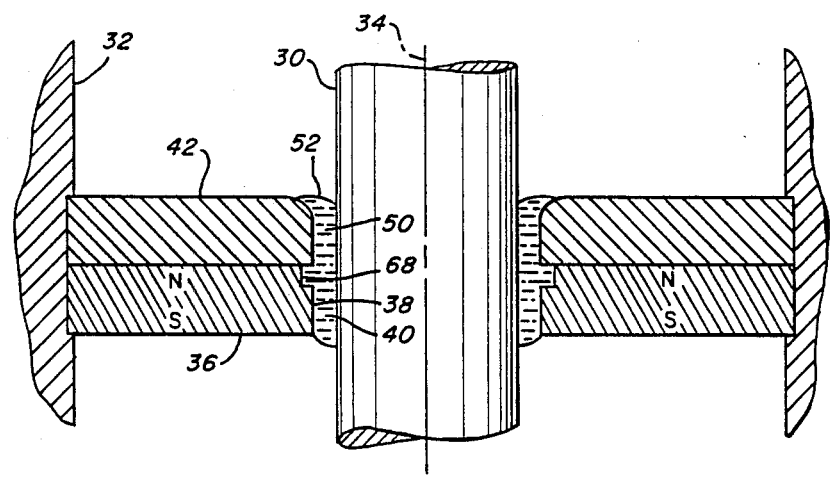
FIG. 8 illustrates another embodiment of a single pole magnetic fluid seal in accordance with the present invention.

Another feature of the present invention is illustrated in FIG. 8. A single pole piece magnetic fluid seal is generally the same as that shown in FIG. 4 and described hereinabove except that the magnet 36 is provided with an annular groove 68 to permit retention of additional magnetic fluid 52 in the seal. The groove 68 is relatively shallow, and preferably the radius of the inner surface 38 of magnet 36 and the radius of groove 68 differ by approximately 0.1 mm to 0.2 mm.

Figure 9:
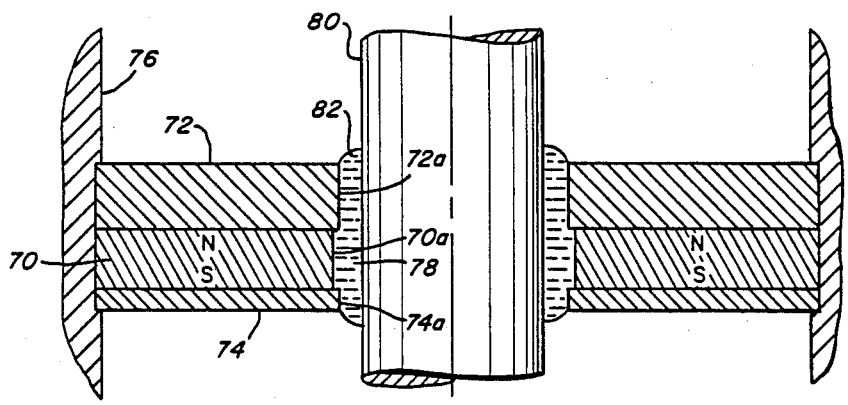
FIG. 9 illustrates a two-pole magnetic fluid seal in accordance with the present invention.

A two-pole piece seal in accordance with the present invention is shown in FIG. 9. An annular permanent magnet 70 has annular pole pieces 72, 74 axially abutting opposite end surfaces of magnet 70. The seal assembly comprising magnet 70 and pole pieces 72, 74 is rigidly attached to a housing 76. The magnet 70 has an inner surface 70a and pole pieces 72, 74 have respective inner surfaces 72a, 74a, radially spaced from a magnetically permeable shaft 80. The magnet 70 and the pole pieces 72, 74 are each in closely-spaced, noncontacting relationship with the shaft and together define an annular space between the shaft and the seal assembly. The inner diameter of magnet 70 is slightly larger than the inner diameter of either of the pole pieces 72, 74 to avoid interference with the shaft 80. However, the inner diameter of magnet 70 and pole pieces 72, 74 should not differ by more than a few thouandths of an inch to insure uniform distribution of magnetic fluid in th gaps. A magnetic fluid 82 is retained in the annular space 78 by the magnetic field produced by magnet 70.

The two-pole seal shown in FIG. 9 can include features described above in connection with the single pole seal. For example, the outer edges of pole piece inner surfaces 72a, 74a can be rounded in order to confine the magnetic flux distribution substantially within the annular space 78. The magnet 70 can be provided with an annular groove for retention of additional magnetic fluid. The interfaces between magnet 70 and pole piece 72 and between magnet 70 and pole piece 74 are sealed to prevent leakage of magnetic fluid.

The two-pole seal shown in FIG. 9 preferably has a magnetic field in the gap between lower pole piece 74 and shaft 80 which is stronger than the magnetic field in the gap between upper pole piece 72 and shaft 80. The purpose of the unequal magnetic field intensities is to insure that when the magnetic fluid is added to the seal, the annular space 78 will be uniformly filled with magnetic fluid. Without such unequal field intensities, there is the possibility that the magnetic fluid 82 will fill only part of the annular space 78, thereby defeating the purpose of the present invention.

In order to obtain different magnetic field intensities, the pole pieces 72, 74 can have different axial dimensions so that the magnetic field is more intense in the gap associated with the thinner pole piece. Also, the radial dimension of the gap between the pole piece inner surfaces 72a, 74a and shaft 80 can be different to vary the magnetic field strength. However, it is desired that the radial dimensions of the gaps not differ by more than a few thousandths from the radial dimension of the gap between the magnet 70 and shaft 80 to insure that the gaps are uniformly filled with magnetic fluid. Alternatively, a combination of different pole piece widths and radial gap dimensions can be utilized. When the magnetic field intensity in the bottom pole piece gap is larger than the intensity in the top pole piece, fluid added at the top pole piece is drawn toward the bottom pole piece by the magnetic field gradient, thereby filling the entire length of the seal.

The magnet material utilized in any of the embodiments of the present invention should be a rigid plastic ferrite or other magnetic material that will not absorb ferrofluid.

In the two-pole magnetic fluid seal of FIG. 9, the axial dimension of magnet 70 is preferably in the range of 0.020 to 0.040 inch and the axial dimension of pole pieces 72, 74 should be in the range of about 0.0010 to 0.040 inch. The radial gap between the shaft 80 and either of the pole pieces 72, 74 should be in the range of about 0.002-inch to 0.010-inch. The radial gap between the magnet 70 and the shaft 80 should be in the range of 0006 to 0.015-inch and should always be slightly larger than the radial gaps between the shaft 80 and the pole pieces 72, 74.

An example of a two-pole long-life magnetic fluid seal in accordance with the present invention was constructed as shown in FIG. 9 and tested. The seal had the following parameters.

Shaft diameter 0.236-inch
Axial dimension of top pole piece 72=0.031-inch
Axial dimension of bottom pole piece 74=0.010-inch
Top radial gap=0.006-inch
Bottom radial gap=0.008-inch
Magnet axial dimension=0.040-inch
Outside diameter of top pole piece=0.630-inch
Inside diameter of top pole piece=0.248-inch
Outside diameter of bottom pole piece=0.630-inch
Inside diameter of bottom pole piece=0.252-inch
Magnet inside diameter=0.268-inch
Magnet outside diameter=0.626-inch
Magnetic fluid type=ester-based 200 Gauss 110 cp at 27° C.

Figure 10:
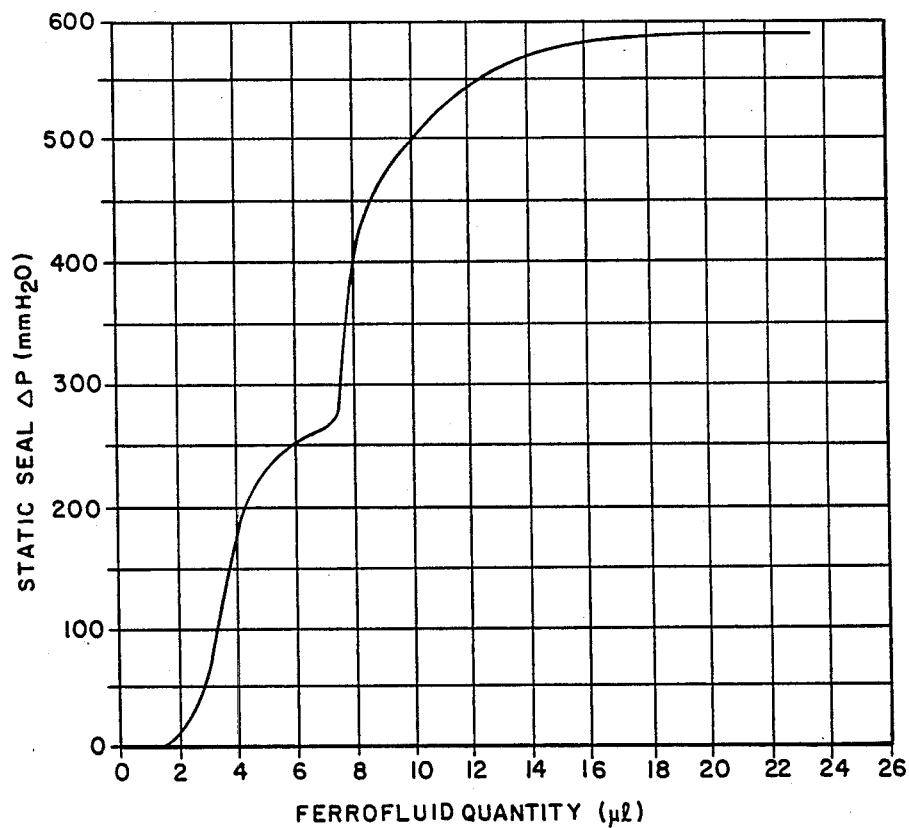
FIG. 10 is a graphic representation of pressure capacity as a function of magnetic fluid quantity for the two-pole magnetic fluid seal of the present invention.

The pressure capacity of this magnetic fluid seal as a function of magnetic fluid quantity is plotted in FIG. 10. The seal is capable of sustaining a pressure differential of 500 millimeters of water. The seal was found to accommodate magnetic fluid quantity in excess of 15 microliters without any splash. An equivalent prior art seal with two unequal pole pieces and having the same physical dimensions will accommodate only 4 microliters of magnetic fluid. The larger quantity of magnetic fluid retained in the seal of the present invention insures a longer seal life.

The seal embodiments described herein can utilize both electrically conducting and nonconducting ferrofluids. When an electrically conducting ferrofluid is used, the outer periphery(s) of the pole piece(s) must be electrically connected to the spindle housing to ground the electrical charge produced at the disk.

While there has been shown and described what is at present considered the preferred embodiments of the present invention, it will be obvious to those skilled in the art that various changes and modifications may be made therein without departing from the scope of the present invention as defined by the appended claims.

What is claimed is:

1. A compact long-life magnetic fluid seal for sealing between a housing and a magnetically permeable shaft, comprising:
   a magnetic assembly coupled to said housing and comprising
   an axially polarized annular magnet producing a magnetic field and having a closely-spaced, noncontacting relationship with said shaft to define a first gap, said magnet including an inner surface which defines the outer periphery of said first gap, and
   an annular pole piece with a first end surface axially abutting a first end surface of said magnet and having a closely-spaced, noncontacting relationship with said shaft to define a second gap, said first and second gaps together defining an annular space between said magnetic assembly and said shaft, said magnetic assembly including means for substantially confining the magnetic flux to said first and second gaps, said confining means comprising the inner surface of said magnet having a generally rounded edge; and
   a magnetic fluid retained in said annular space by said magnetic field, said magnet and said pole piece being dimensioned so that said first gap has a slightly larger radial dimension than said second gap and so that sufficient magnetic field is provided in said first gap and in said second gap to retain said magnetic fluid in both said first gap and said second gap, said magnetic fluid being retained substantially entirely with said first gap and said second gap by said magnetic field and sealing said shaft and said housing.

2. A magnetic fluid seal as defined in claim 1 wherein said pole piece includes an inner surface which defines the outer periphery of said second gap and wherein said confining means further comprises said inner surface of said pole piece having a generally rounded edge.

3. A magnetic fluid seal as defined in claim 1 wherein said first end surface of said magnet and said first end surface of said pole piece are sealed to prevent leakage of said magnetic fluid therebetween.

4. A magnetic fluid seal as defined in claim 1 wherein said magnet includes an inner surface which defines the outer periphery of said first gap and wherein said inner surface is provided with an annular groove having a radius that is slightly larger than the radial dimension of said first gap, so that the magnetic field adjacent to the groove is sufficient to retain magnetic fluid in a region between said groove and said shaft.

5. A magnetic fluid seal as defined in claim 1 wherein said magnetic fluid is electrically conducting, and the pole piece is electrically connected to the housing.

* * * * *